(12) United States Patent
Choi et al.

(10) Patent No.: US 7,221,410 B2
(45) Date of Patent: May 22, 2007

(54) TELEVISION RECEIVING MODULE AND DISPLAY APPARATUS AND TELEVISION RECEIVING SYSTEM USING THE SAME

(75) Inventors: Nam Su Choi, Kyungki-do (KR); Jong Jin Lee, Kyungki-do (KR); Dae Young Jung, Kyungki-do (KR); Jin Seog Kang, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 556 days.

(21) Appl. No.: 10/625,682

(22) Filed: Jul. 24, 2003

(65) Prior Publication Data

US 2004/0165119 A1    Aug. 26, 2004

(30) Foreign Application Priority Data

Dec. 16, 2002  (KR) ............... 10-2002-0080097
Dec. 16, 2002  (KR) ............... 10-2002-0080135
Dec. 16, 2002  (KR) ............... 10-2002-0080136
Dec. 16, 2002  (KR) ............... 10-2002-0080137

(51) Int. Cl.
    *H04N 5/63* (2006.01)
(52) U.S. Cl. ..................... 348/725; 348/554
(58) Field of Classification Search ............ 348/730, 348/731, 725, 726, 553, 554; 725/131, 139
See application file for complete search history.

(56) References Cited

U.S. PATENT DOCUMENTS 5,592,234 A * 1/1997 Gardner et al. ............ 348/553

(Continued)

FOREIGN PATENT DOCUMENTS

DE    299 12 494    12/1999

(Continued)

OTHER PUBLICATIONS

German Patent Office, Office Action, mailed Jun. 30, 2006.

(Continued)

*Primary Examiner*—Michael H. Lee
(74) *Attorney, Agent, or Firm*—Lowe Hauptman & Berner, LLP.

(57) ABSTRACT

A TV receiving module and a display apparatus and a TV receiving system using the same, wherein the TV receiving module is small in size and is detachably mounted outside or inside of the display apparatus. The TV receiving module is adapted to select and receive a TV signal of a desired broadcast from among TV signals inputted from a TV broadcast receiving antenna or cable, and provide the received TV signal. A detachable connector unit includes a first connector installed in the TV receiving module for receiving external power and an external control signal and providing the TV signal received by the TV receiving module externally, and a second connector detachably coupled with the first connector. The display apparatus is connected to the TV receiving module via the second connector of the detachable connector unit to provide the external power and external control signal to the TV receiving module, receive the TV signal from the TV receiving module and output video and audio signals of the received TV signal. The display apparatus may be an LCD monitor or a PDP TV receiver.

5 Claims, 10 Drawing Sheets

U.S. PATENT DOCUMENTS

| | | | |
|---|---|---|---|
| 5,914,501 A | | 6/1999 | Antle et al. |
| 5,949,493 A | * | 9/1999 | Mudra et al. ............... 348/553 |
| 6,049,359 A | | 4/2000 | Vogel et al. |
| 6,483,553 B1 | * | 11/2002 | Jung ......................... 348/731 |
| 7,020,890 B1 | * | 3/2006 | Suematsu et al. ............ 725/78 |
| 2002/0171774 A1 | | 11/2002 | Lee |
| 2002/0186329 A1 | | 12/2002 | Tong et al. |
| 2004/0025188 A1 | * | 2/2004 | Bertin et al. ................ 725/131 |

FOREIGN PATENT DOCUMENTS

| | | |
|---|---|---|
| EP | 0 794 669 | 9/1997 |
| EP | 1 156 671 | 11/2001 |
| JP | 61-251279 | 11/1986 |
| JP | 61-251280 | 11/1986 |
| JP | 07-264521 | 10/1995 |
| JP | 07-264524 | 10/1995 |
| JP | 8005986 | 1/1996 |
| JP | 8005993 | 1/1996 |
| JP | 09-261563 | 10/1997 |
| JP | 9288526 | 11/1997 |
| JP | 10-503905 | 4/1998 |
| JP | 2000-330531 | 11/2000 |
| JP | 2001078120 | 3/2001 |
| JP | 2002-44557 | 2/2002 |
| JP | 2002171449 | 6/2002 |
| JP | 2002218357 | 6/2002 |
| JP | 2002207472 | 7/2002 |
| WO | WO96/19895 | 6/1996 |
| WO | 01/03426 | 1/2001 |
| WO | WO02/071747 | 9/2002 |

OTHER PUBLICATIONS

Japanese Patent Office, Office Action, mailed Aug. 1, 2006.

* cited by examiner

TELEVISION RECEIVING MODULE AND DISPLAY APPARATUS AND TELEVISION RECEIVING SYSTEM USING THE SAME

BACKGROUND OF THE INVENTION

1. Field of the Invention

The present invention relates to a television (referred to hereinafter as TV) receiving system using a display apparatus such as a liquid crystal display (LCD) monitor, a plasma display panel (PDP) TV receiver or etc., and more particularly to a TV receiving module and a display apparatus and a TV receiving system using the same, wherein the TV receiving module is small in size and is detachably mounted outside or inside of the display apparatus, and the display apparatus supplies desired power to the TV receiving module and controls a TV receiving operation and a display operation at one time through a simple operation such as a one-touch operation.

2. Description of the Related Art

In general terms, people must purchase TV sets to watch TV broadcasts. Because TV sets are becoming increasingly expensive, there have recently been proposed schemes capable of replacing TV sets, such as a method of watching TV broadcasts using computers. One example of such schemes is a method using a TV receiving card and monitor of a computer and another example is a method using a set-top box and a monitor.

Figure 1:
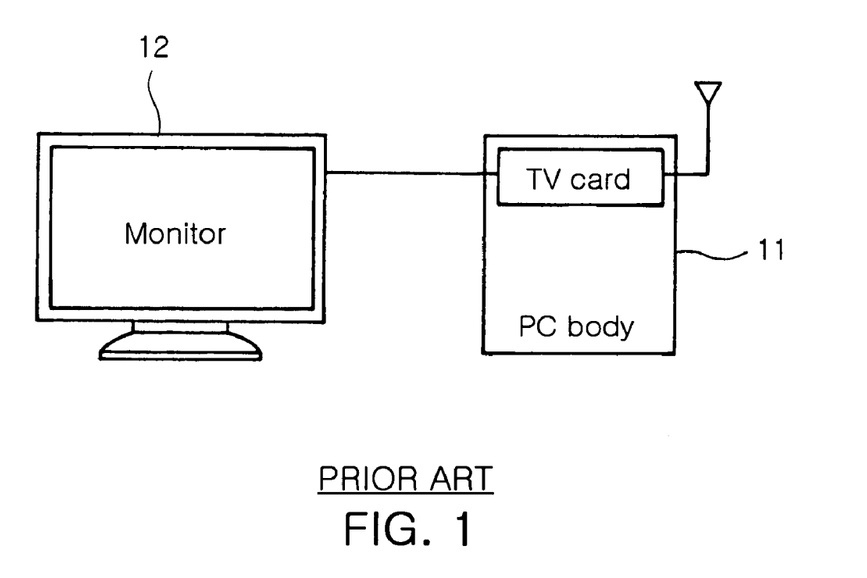
FIG. 1 is a schematic view of a conventional TV receiving apparatus using a computer system.

FIG. 1 is a schematic view of a conventional TV receiving apparatus using a computer system. As shown in this drawing, the conventional TV receiving apparatus comprises a TV card installed in a computer body 11 and connected to an antenna for receiving and processing a desired TV broadcast signal, and a computer monitor 12 for outputting a TV picture from the TV card.

However, the above-mentioned conventional TV receiving apparatus using the computer system has a disadvantage in that it is necessary to install the TV card in the computer body, resulting in a relatively high start-up price for the watching of TV broadcasts. Further, the conventional TV receiving apparatus is inconvenient to use for TV watching in that a long time is needed for booting the computer prior to TV watching.

Figure 2:
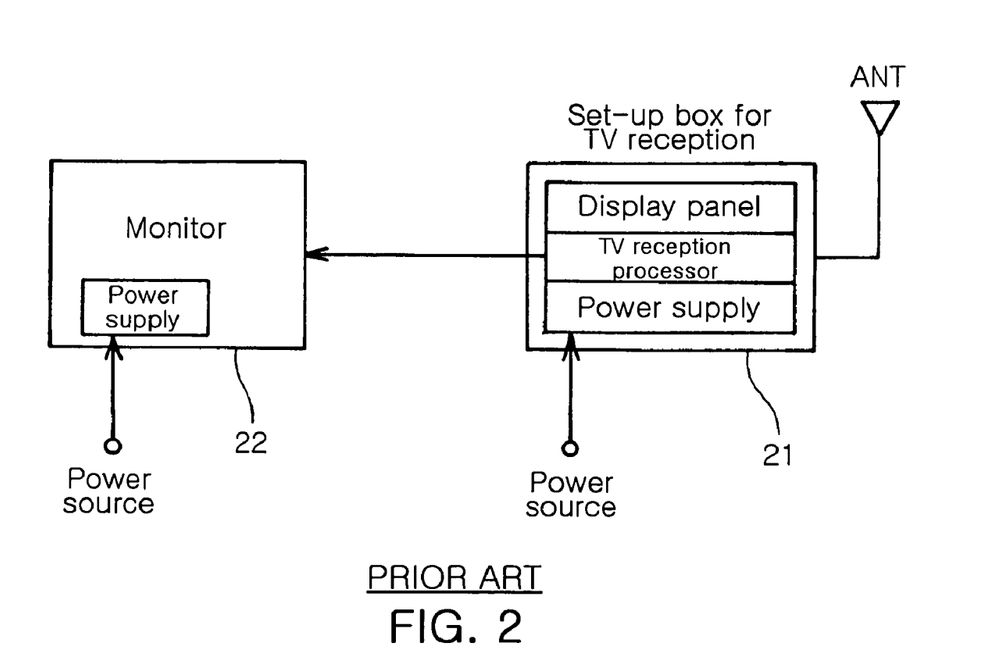
FIG. 2 is a schematic view of a conventional TV receiving apparatus using a set-top box.

FIG. 2 is a schematic view of a conventional TV receiving apparatus using a set-top box. As shown in this drawing, the conventional TV receiving apparatus comprises a set-top box for TV reception 21 including a power supply for supplying self-power, a display panel for displaying a receiving channel and an operating state and a TV reception processor, and a monitor 22 for outputting a TV signal from the set-top box 21 for TV reception. The monitor 22 includes an internal or external speaker for outputting sound.

However, the above-mentioned conventional TV receiving apparatus using the set-top box is disadvantageous in that the TV receiving set-top box must include the power supply which supplies the self-power and the display panel which displays the receiving channel and operating state, besides the TV reception processor, thereby causing a considerable increase in size. In this connection, the TV receiving set-top box cannot be detachably and directly coupled with a computer monitor, such as an LCD monitor, and must occupy a separate space for its use.

In addition to the above problem of size, a great cost is required in manufacturing such a conventional set-top box for TV reception, thereby reducing the competitiveness thereof in the market place.

SUMMARY OF THE INVENTION

Therefore, the present invention has been made in view of the above problems, and it is an object of the present invention to provide a TV receiving module and a display apparatus and a TV receiving system using the same, wherein the TV receiving module is small in size and is detachably mounted outside or inside of the display apparatus, and the display apparatus is preferably an LCD monitor or a PDP TV receiver and is adapted to supply desired power to the TV receiving module and control a TV receiving operation and a display operation at one time through a simple operation such as a one-touch operation.

It is another object of the present invention to provide a TV receiving module and a display apparatus and a TV receiving system using the same, wherein the TV receiving module has no self-display panel and self-power supply, thereby making it possible to manufacture the TV receiving module in a small-size form, simply and conveniently mount it on the display apparatus and utilize a computer monitor as a TV receiver.

In accordance with one aspect of the present invention, the above and other objects can be accomplished by the provision of a television (TV) receiving module which is connected to a display apparatus and adapted to receive TV broadcasts, comprising connector means for receiving power and a control signal from the display apparatus and providing a TV signal thereto; a memory for storing a control firmware and data necessary for control and operation; a microprocessor for receiving the power through the connector means, the microprocessor being operated according to the control firmware stored in the memory to receive the control signal through the connector means, provide a TV broadcast selection signal in response to the received control signal, perform a desired signal processing with respect to an input TV signal and provide the resulting TV signal to the display apparatus via the connector means; tuner means for receiving the power through the connector means, selecting a TV signal of a desired broadcast from among TV signals inputted from a TV broadcast receiving antenna or cable in response to the TV broadcast selection signal from the microprocessor and providing the selected TV signal as the input TV signal to the microprocessor; and an audio processor for processing an audio signal of the TV signal from the microprocessor.

Preferably, the tuner means may include a tuner and analog demodulator for reception of an analog TV broadcast, or a tuner and digital demodulator for reception of a digital TV broadcast. More preferably, the tuner means may include all of a tuner, an analog demodulator and a digital demodulator in order to support both the analog broadcast reception and digital broadcast reception to cope with external selection of any one thereof.

In accordance with another aspect of the present invention, there is provided a display apparatus which is connected to a TV receiving module and adapted to output video and audio signals of a TV broadcast, comprising a power supply for supplying internal power to the display apparatus and external power to the TV receiving module, respectively; connector means for providing the external power from the power supply and a control signal to the TV receiving module and receiving a TV signal from the TV receiving module; a key input unit including a plurality of keys necessary for a TV receiving operation, the keys including a TV channel selection key and a volume adjustment key; a controller for generating a control signal corresponding to a key signal inputted through the key input unit, providing the generated control signal to the TV receiving module through the connector means to control the TV receiving operation in response to the key signal, and receiving the TV signal from the TV receiving module through the connector means; a signal processor for processing a video signal of the TV signal from the connector means to be displayable on a screen and adjusting a level of an audio signal of the TV signal; a display unit for outputting a video signal from the signal processor to the screen; and a speaker for outputting an audio signal from the signal processor.

Preferably, the power supply may supply a plurality of different voltages to the TV receiving module to eliminate a need for a power supply circuit to be provided in the TV receiving module.

The display apparatus may be any one of a TV receiver for receiving analog TV broadcasts, a plasma display panel (PDP) TV receiver or a display apparatus for a computer, such as a liquid crystal display (LCD) monitor.

In accordance with yet another aspect of the present invention, there is provided a TV receiving system comprising a TV receiving module for selecting and receiving a TV signal of a desired broadcast from among TV signals inputted from a TV broadcast receiving antenna or cable and providing the received TV signal; detachable connector means including a first connector installed in the TV receiving module for receiving external power and an external control signal and providing the TV signal received by the TV receiving module externally, and a second connector detachably coupled with the first connector; and a display apparatus connected to the TV receiving module via the second connector of the detachable connector means for providing the external power and external control signal to the TV receiving module, receiving the TV signal from the TV receiving module and outputting video and audio signals of the received TV signal.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a perspective view showing the outer appearance of the external module-type TV receiving system in accordance with the first embodiment of the present invention, wherein:

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings.

Figure 3:
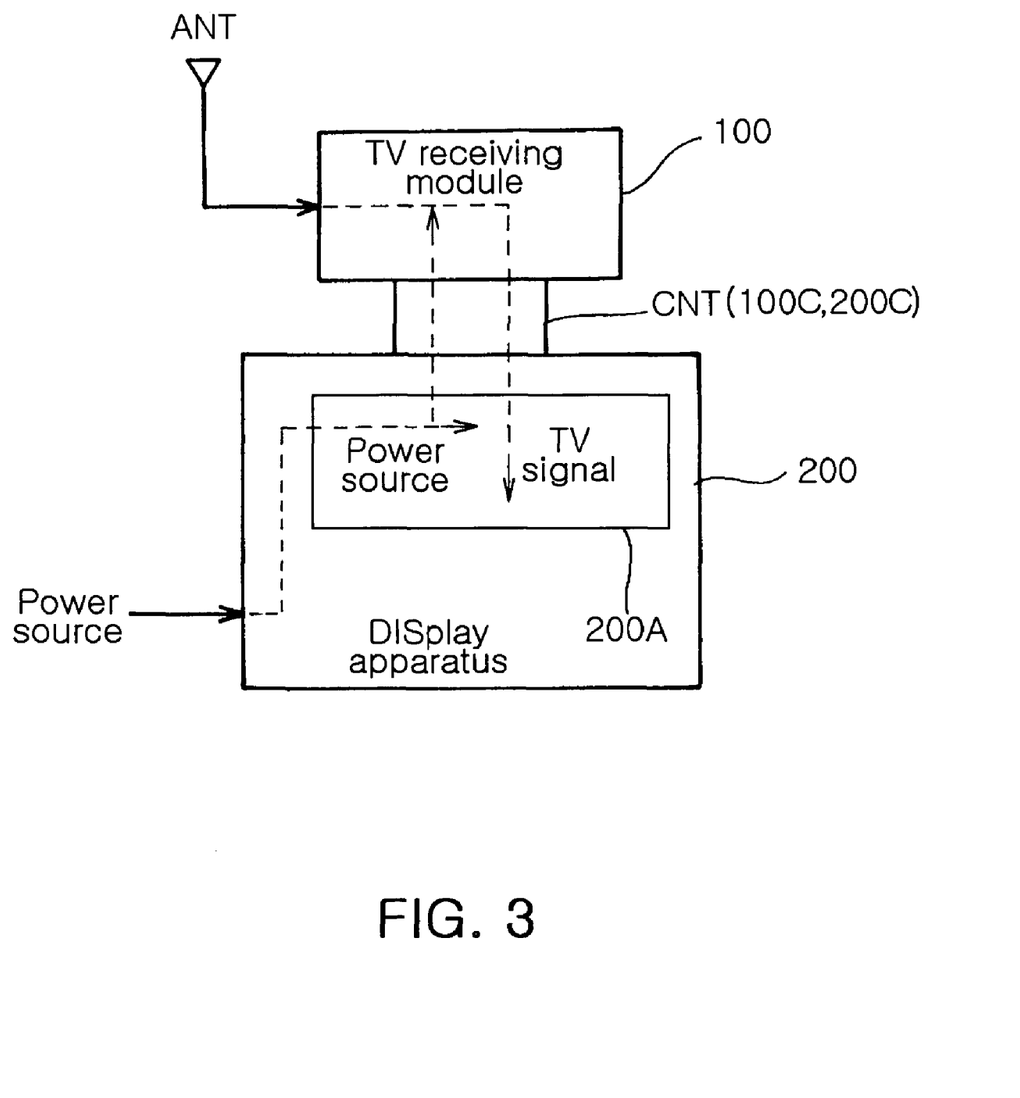
FIG. 3 is a view schematically showing the overall construction of an external module-type TV receiving system in accordance with a first embodiment of the present invention.

FIG. 3 is a view schematically showing the overall construction of an external module-type TV receiving system in accordance with a first embodiment of the present invention.

With reference to FIG. 3, the external module-type TV receiving system comprises a TV receiving module 100 for selecting and receiving a TV signal of a desired broadcast from among TV signals inputted from a TV broadcast receiving antenna ANT or cable and providing the received TV signal, and a detachable connector unit CNT including a first connector 100C installed in the TV receiving module 100 for receiving external power and an external control signal and providing the TV signal received by the TV receiving module 100 externally, and a second connector 200C detachably coupled with the first connector 100C. The external module-type TV receiving system further comprises a display apparatus 200 connected to the TV receiving module 100 via the second connector 200C of the detachable connector unit CNT for providing the external power and external control signal to the TV receiving module 100, receiving the TV signal from the TV receiving module 100 and outputting video and audio signals of the received TV signal. The display apparatus 200 includes a display main circuit module 200A.

Figure 4:
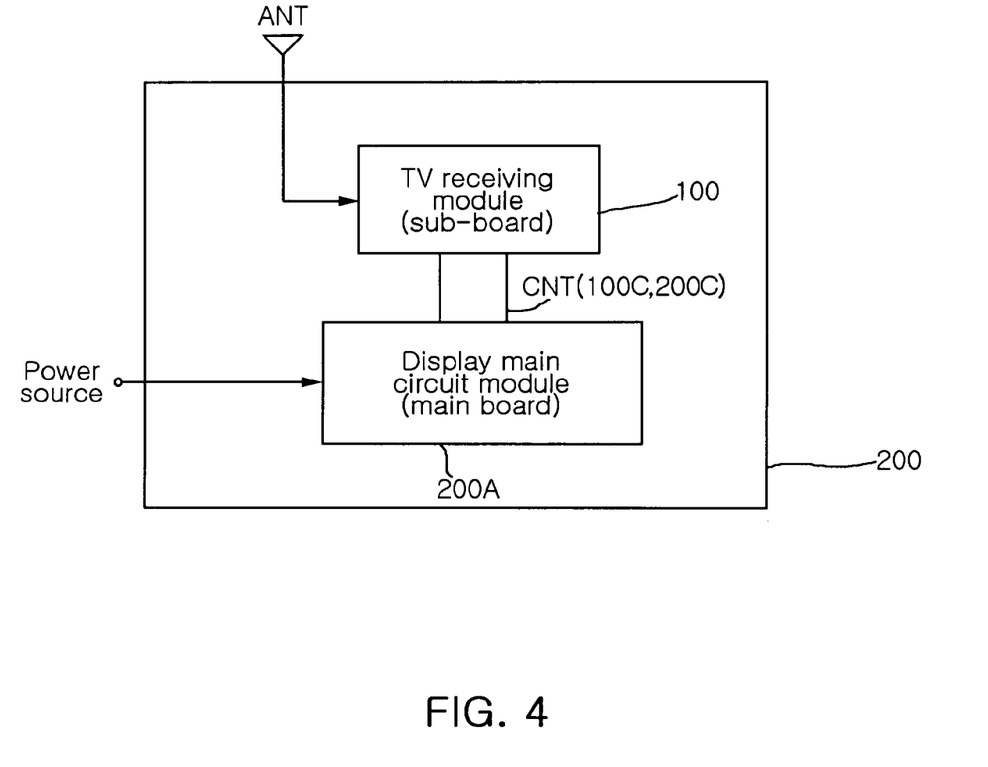
FIG. 4 is a view schematically showing the overall construction of an internal module-type TV receiving system in accordance with a second embodiment of the present invention.

FIG. 4 is a view schematically showing the overall construction of an internal module-type TV receiving system in accordance with a second embodiment of the present invention.

With reference to FIG. 4, the internal module-type TV receiving system comprises a display apparatus 200 including a TV receiving module 100, a display main circuit module 200A and a detachable connector unit CNT for detachably connecting the TV receiving module 100 and the display main circuit module 200A with each other.

The TV receiving module 100 is adapted to select and receive a TV signal of a desired broadcast from among TV signals inputted from a TV broadcast receiving antenna ANT or cable, and provide the received TV signal.

The detachable connector unit CNT includes a first connector 100C installed in the TV receiving module 100 for receiving external power and an external control signal and providing the TV signal received by the TV receiving module 100 externally, and a second connector 200C detachably coupled with the first connector 100C.

The display main circuit module 200A is connected to the TV receiving module 100 via the second connector 200C of the detachable connector unit CNT to provide the external power and external control signal to the TV receiving module 100, receive the TV signal from the TV receiving module 100 and output video and audio signals of the received TV signal.

Figure 5A:
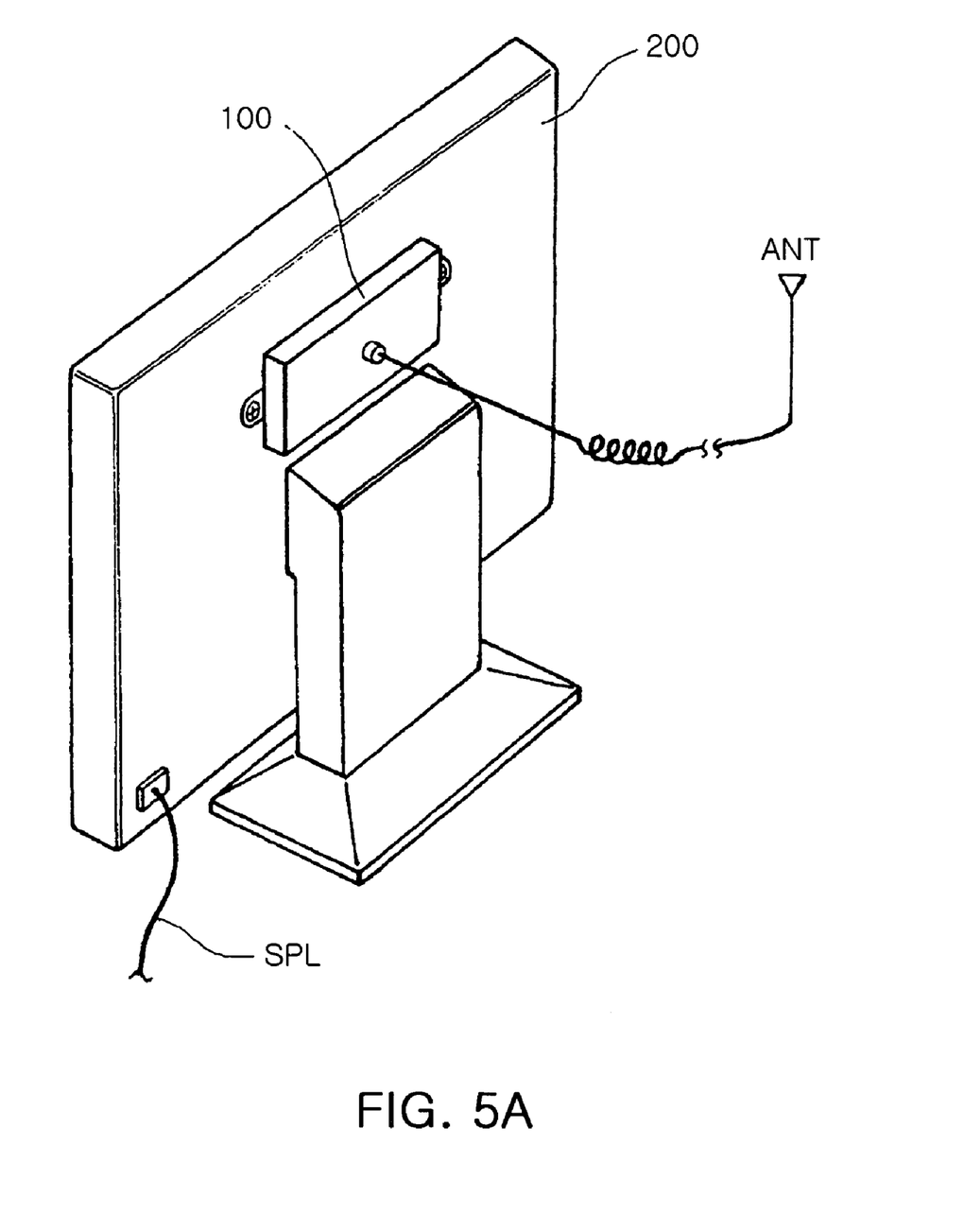
FIG. 5a is a perspective view showing a connected state of a TV receiving module and a display apparatus.
Figure 5B:
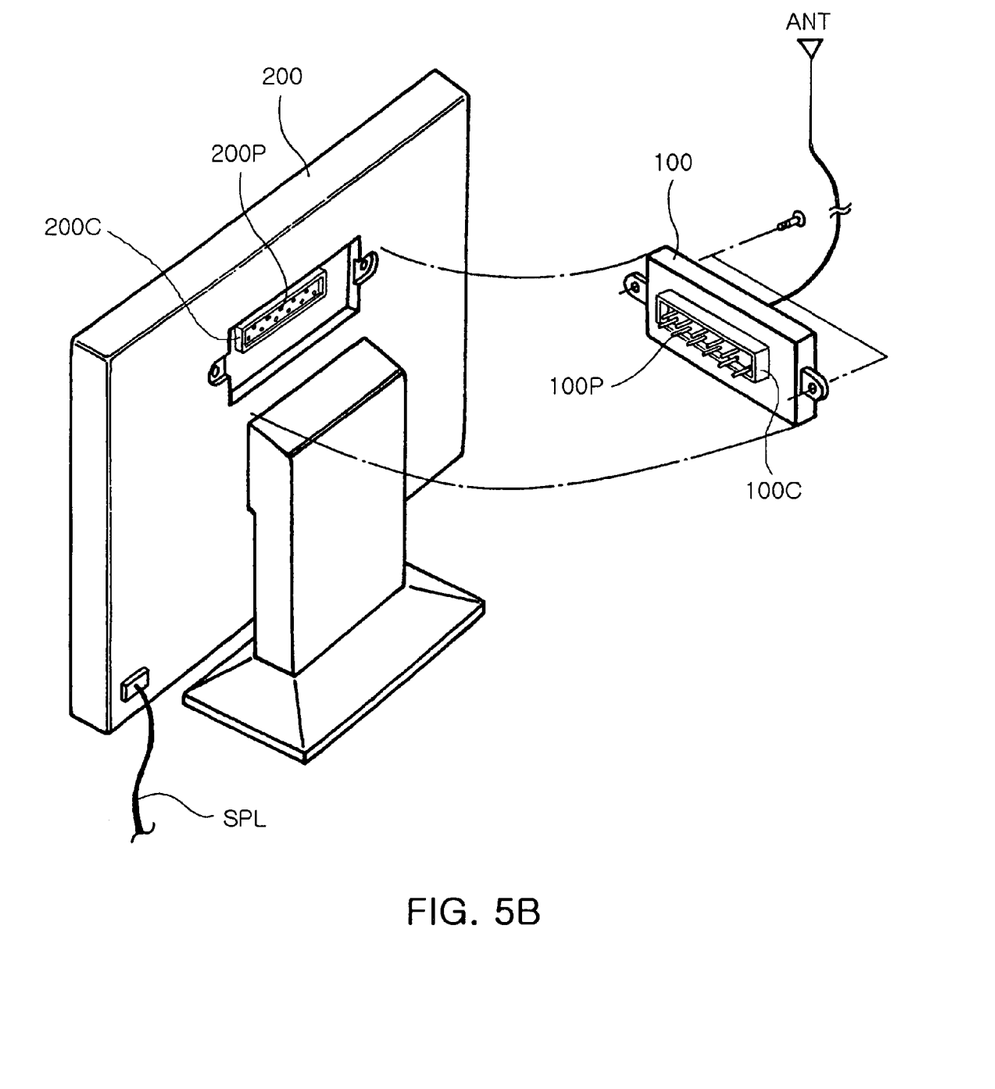
FIG. 5b is a perspective view showing a disconnected state of the TV receiving module and the display apparatus.

FIG. 5 is a perspective view showing the outer appearance of the external module-type TV receiving system in accordance with the first embodiment of the present invention, wherein FIG. 5a is a perspective view showing a connected state of the TV receiving module 100 and the display apparatus 200 and FIG. 5b is a perspective view showing a disconnected state of the TV receiving module 100 and the display apparatus 200.

With reference to FIGS. 5a and 5b, the TV receiving module 100 and display apparatus 200 of the present invention can be detachably connected with each other via the detachable connector unit CNT (FIG. 5a) or be disconnected from each other (FIG. 5b). The display apparatus 200 of the present invention may preferably be a computer display apparatus, namely, a computer monitor. In this case, the display apparatus 200 functions as a computer monitor under the condition that it is disconnected from the TV receiving module 100, and as a TV receiver under the condition that it is connected with the TV receiving module 100.

It should be noted that the display apparatus of the present invention is not limited to a computer monitor. For example, the display apparatus of the present invention may be a TV receiver for receiving analog TV broadcasts, a TV receiver for receiving digital TV broadcasts, or a PDP TV receiver. For use of such a TV receiver as the display apparatus according to the present invention, it is preferable that it has no TV receiving module, since the external TV receiving module according to the present invention is detachably connected to such a TV receiver.

Figure 6:
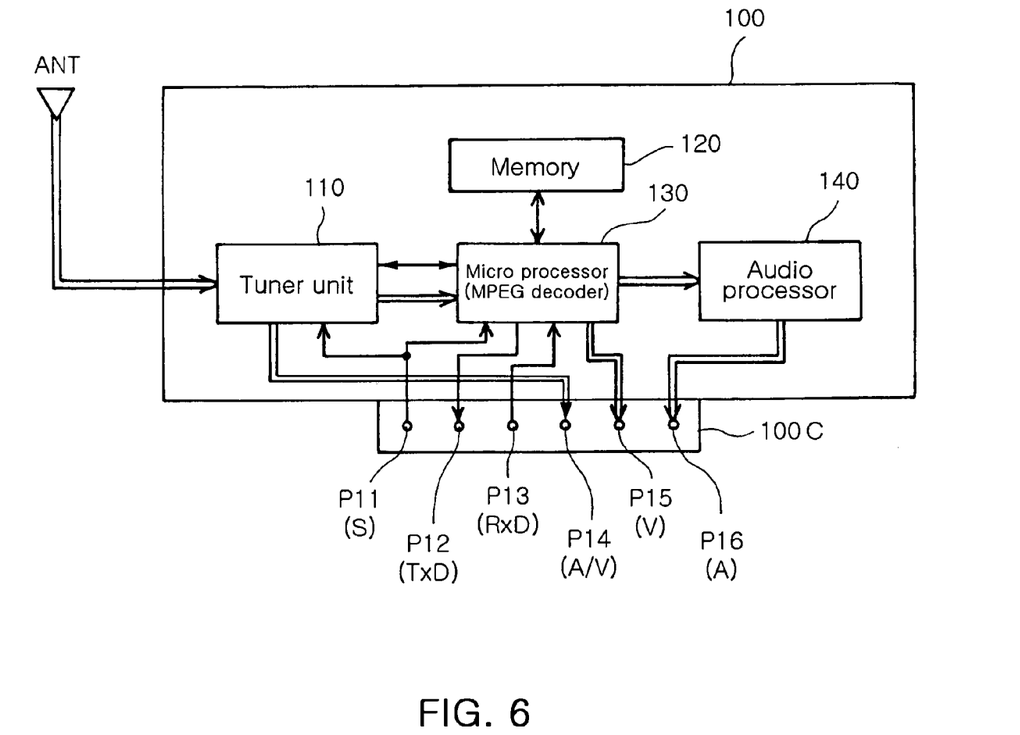
FIG. 6 is a block diagram showing the construction of the TV receiving module according to the present invention.

FIG. 6 is a block diagram showing the construction of the TV receiving module 100 according to the present invention.

With reference to FIG. 6, the TV receiving module 100 according to the present invention is connected to the display apparatus 200 and adapted to receive TV broadcasts. To this end, the TV receiving module 100 includes a first connector 100C for receiving power and a control signal from the display apparatus 200 and providing a TV signal thereto, a memory 120 for storing a control firmware and data necessary for control and operation, and a microprocessor 130 for receiving the power through the first connector 100C. The microprocessor 130 is operated according to the control firmware stored in the memory 120 to receive the control signal through the first connector 100C, provide a TV broadcast selection signal in response to the received control signal, perform a desired signal processing with respect to an input TV signal and provide the resulting TV signal to the display apparatus 200 via the first connector 100C. The TV receiving module 100 further includes a tuner unit 110 for receiving the power through the first connector 100C, selecting a TV signal of a desired broadcast from among TV signals inputted from a TV broadcast receiving antenna ANT or cable in response to the TV broadcast selection signal from the microprocessor 130 and providing the selected TV signal as the input TV signal to the microprocessor 130, and an audio processor 140 for processing an audio signal of the TV signal from the microprocessor 130.

The microprocessor 130 may extract TV reception information from the input TV signal and provide the extracted TV reception information along with the TV signal. The TV reception information generally includes TV receiving channel information and other character information. The microprocessor 130 may also provide state information such as channel selection completion and poor reception.

The TV broadcast selection signal of the microprocessor 130 is generally a TV channel selection signal. Alternatively, the TV broadcast selection signal may be a signal containing an analog broadcast/digital broadcast selection signal for selection of an analog TV broadcast or a digital TV broadcast, and a TV channel selection signal for selection of a channel in the selected analog TV broadcast or digital TV broadcast.

In connection with the TV broadcast selection signal of the microprocessor 130, the tuner unit 110 may include a tuner and analog demodulator for reception of an analog TV broadcast, or a tuner and digital demodulator for reception of a digital TV broadcast. It is preferable that the tuner unit 110 includes all of a tuner, an analog demodulator and a digital demodulator in order to support both the analog broadcast reception and digital broadcast reception to cope with external selection of any one thereof.

The tuner functions to select a TV broadcast channel in response to the channel selection signal of the TV broadcast selection signal from the microprocessor 130. The analog demodulator is operated in response to the analog broadcast/digital broadcast selection signal of the TV broadcast selection signal to demodulate an analog TV broadcast signal selected by the tuner and provide the resulting audio and video signals through the first connector 100C. The digital demodulator is operated in response to the analog broadcast/digital broadcast selection signal of the TV broadcast selection signal to demodulate a digital TV broadcast signal selected by the tuner and provide the resulting MPEG (Moving Picture Experts Group) signal to the microprocessor 130.

The first connector 100C includes a power terminal S for receiving the power from the display apparatus 200, a transmission terminal TxD for outputting TV reception information from the microprocessor 130, a reception terminal RxD for receiving the control signal from the display apparatus, an A/V terminal A/V for outputting an analog A/V signal from the tuner unit 110, a video signal terminal V for outputting a video signal from the microprocessor 130, and an audio signal terminal A for outputting an audio signal from the audio processor 140. The power terminal S, transmission terminal TxD, reception terminal RxD, A/V terminal A/V, video signal terminal V and audio signal terminal A of the first connector 100C are preferably implemented, respectively, with pins P11-P16 for the convenience of connection and disconnection.

Figure 7:
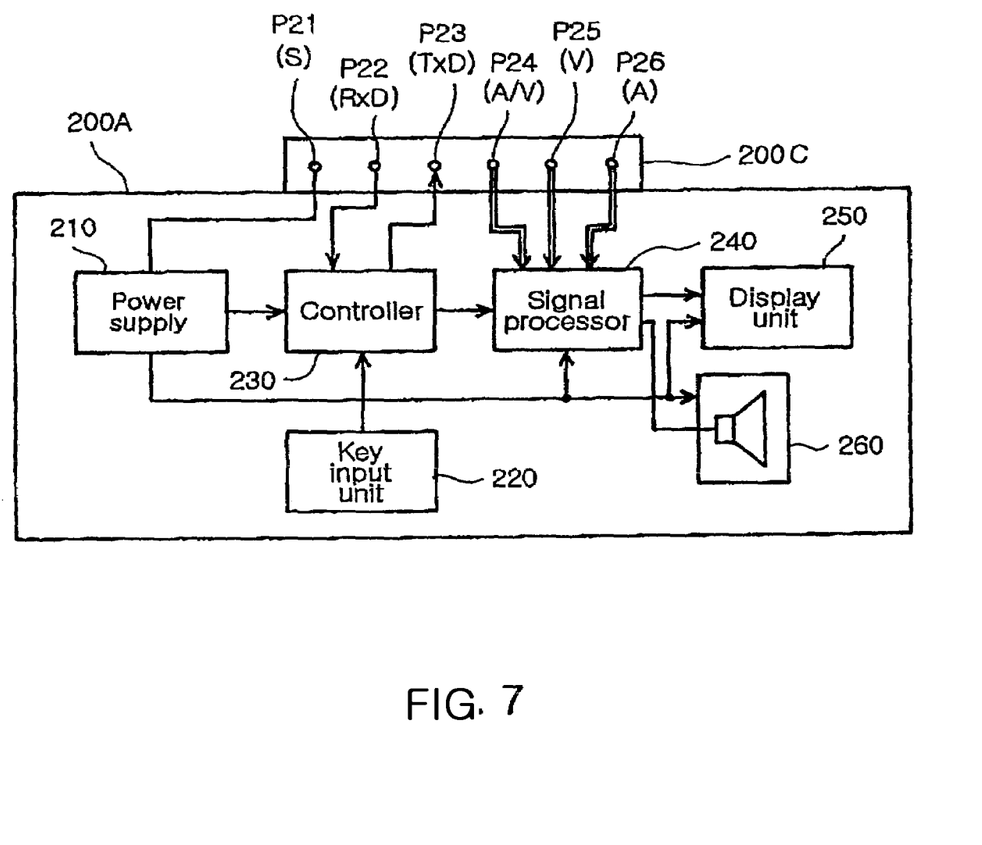
FIG. 7 is a block diagram showing the construction of the display apparatus according to the present invention.

FIG. 7 is a block diagram showing the construction of the display apparatus 200 according to the present invention.

With reference to FIG. 7, the display apparatus 200 according to the present invention is connected to the TV receiving module 100 and adapted to output video and audio signals of a TV broadcast. To this end, the display apparatus 200 includes a power supply 210 for supplying internal power to the display apparatus and external power to the TV receiving module, respectively, a second connector 200C for providing the external power from the power supply 210 and a control signal to the TV receiving module and receiving a TV signal from the TV receiving module, and a key input unit 220 including a plurality of keys necessary for a TV receiving operation, which keys include a TV channel selection key and a volume adjustment key. The display apparatus 200 further includes a controller 230 for generating a control signal corresponding to a key signal inputted through the key input unit 220, providing the generated control signal to the TV receiving module through the second connector 200C to control the TV receiving operation in response to the key signal, and receiving the TV signal from the TV receiving module through the second connector 200C, a signal processor 240 for processing a video signal of the TV signal from the second connector 200C to be displayable on a screen and adjusting the level of an audio signal of the TV signal, a display unit 250 for outputting a video signal from the signal processor 240 to the screen, and a speaker 260 for outputting an audio signal from the signal processor 240.

As stated previously with reference to FIGS. 3 and 4, the display apparatus 200 includes the display main circuit module 220A, which includes the power supply 210, controller 230 and signal processor 240. The other components of the display apparatus 200, or the second connector 200C, key input unit 220, display unit 250 and speaker 260, are electrically connected with associated blocks of the display main circuit module 220A, respectively.

The second connector 200C includes a power terminal S for supplying the external power from the power supply 210 to the TV receiving module, a reception terminal R×D for receiving TV reception information from the TV receiving module, a transmission terminal T×D for transmitting the control signal from the controller 230 to the TV receiving module, an A/V terminal A/V for receiving an analog A/V signal from the TV receiving module, a video signal terminal V for receiving a video signal from the TV receiving module, and an audio signal terminal A for receiving an audio signal from the TV receiving module. The power terminal S, transmission terminal T×D, reception terminal R×D, A/V terminal A/V, video signal terminal V and audio signal terminal A of the second connector 200C are preferably implemented, respectively, with pins P21-P26 for the convenience of connection and disconnection.

Figure 8:
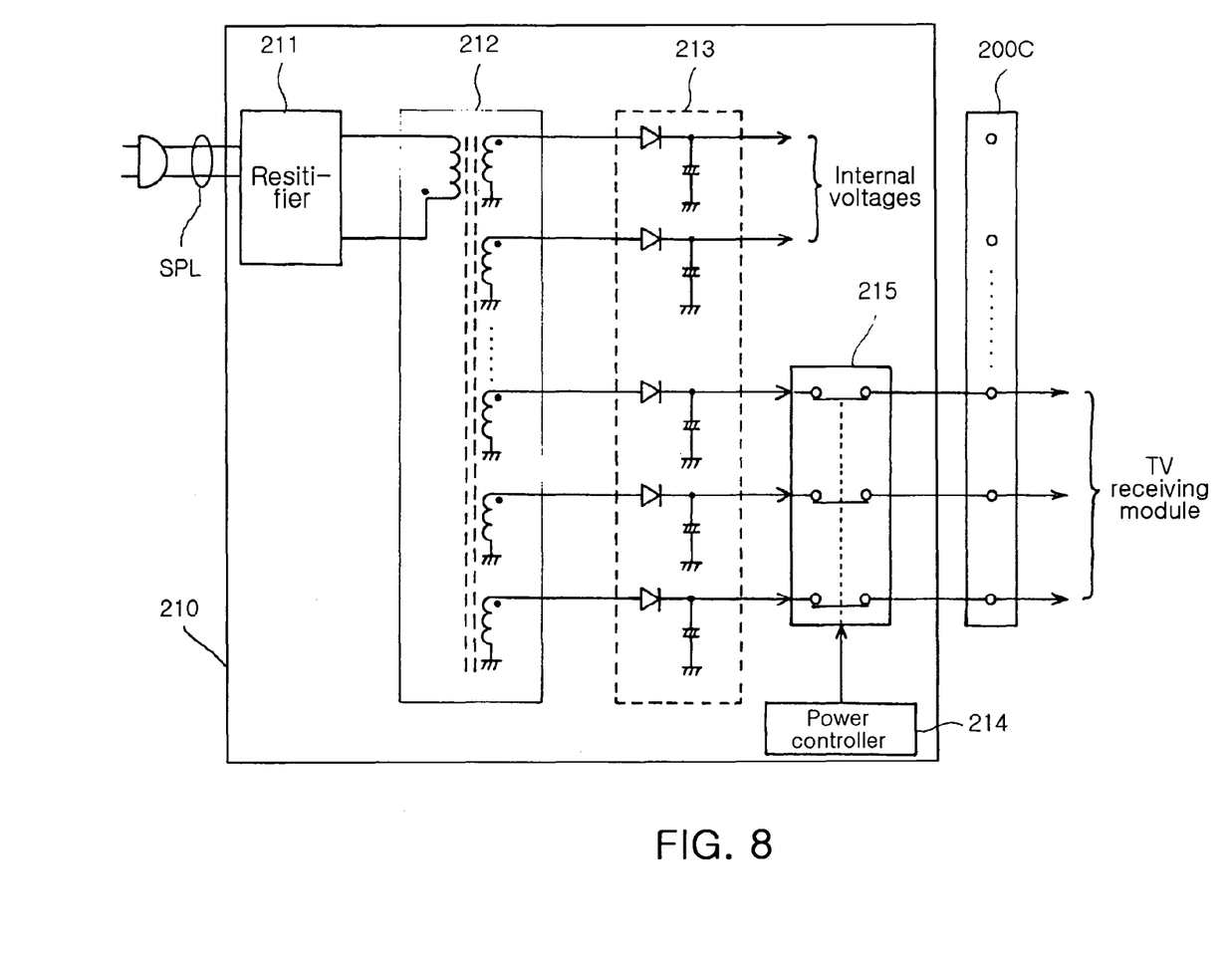
FIG. 8 is a circuit diagram of a power supply in FIG. 7.

FIG. 8 is a circuit diagram of the power supply 210 in FIG. 7.

With reference to FIG. 8, the power supply 210 preferably supplies a plurality of different voltages necessary for the TV receiving module, for example, 5V, 12V, etc. to eliminate a need for a power supply circuit to be provided in the TV receiving module.

To this end, the power supply 210 includes a rectifier 211 for rectifying an alternating current (AC) voltage, a switch mode power supply (SMPS) circuit 212 for receiving an output voltage from the rectifier 211 and supplying internal voltages to the display apparatus 200 and external voltages to the TV receiving module 100, respectively, and a voltage output circuit 213 for detecting and outputting the internal and external voltages from the SMPS circuit 212. The SMPS circuit 212 preferably supplies a plurality of voltages, including a 12V voltage, as the internal voltages to the display apparatus 200. The SMPS circuit 212 is further adapted to supply voltages of 12V and 5V as the external voltages to the TV receiving module 100.

The power supply 210 further includes a power controller 214 for providing a power control signal to control the output of the external voltages to the TV receiving module 100, and a power switch 215 for switching on/off the output of the external voltages from the voltage output circuit 213 to the TV receiving module 100 in response to the power control signal from the power controller 214. The external voltages from the voltage output circuit 213 are supplied to the TV receiving module 100 through the second connector 200C.

Notably, a TV receiver for receiving analog TV broadcasts, or a PDP TV receiver can be used as the display apparatus of the present invention. In this case, it is preferable that such a TV receiver has no TV receiving function or TV tuner, since the external TV receiving module 100 according to the present invention is detachably connected to such a TV receiver.

Alternatively, a computer monitor, such as an LCD monitor, may be applied as the display apparatus of the present invention. In this case, the key input unit 220 has to further include a TV/monitor mode selection key, and the controller 230 must be configured to control a TV receiving operation or monitor operation. In other words, in the case where a computer monitor is applied as the display apparatus of the present invention, it must be selectively operated in a TV reception mode or monitor mode as stated previously, in a different manner from the case where a tunerless TV receiver is applied as the display apparatus.

Figure 9:
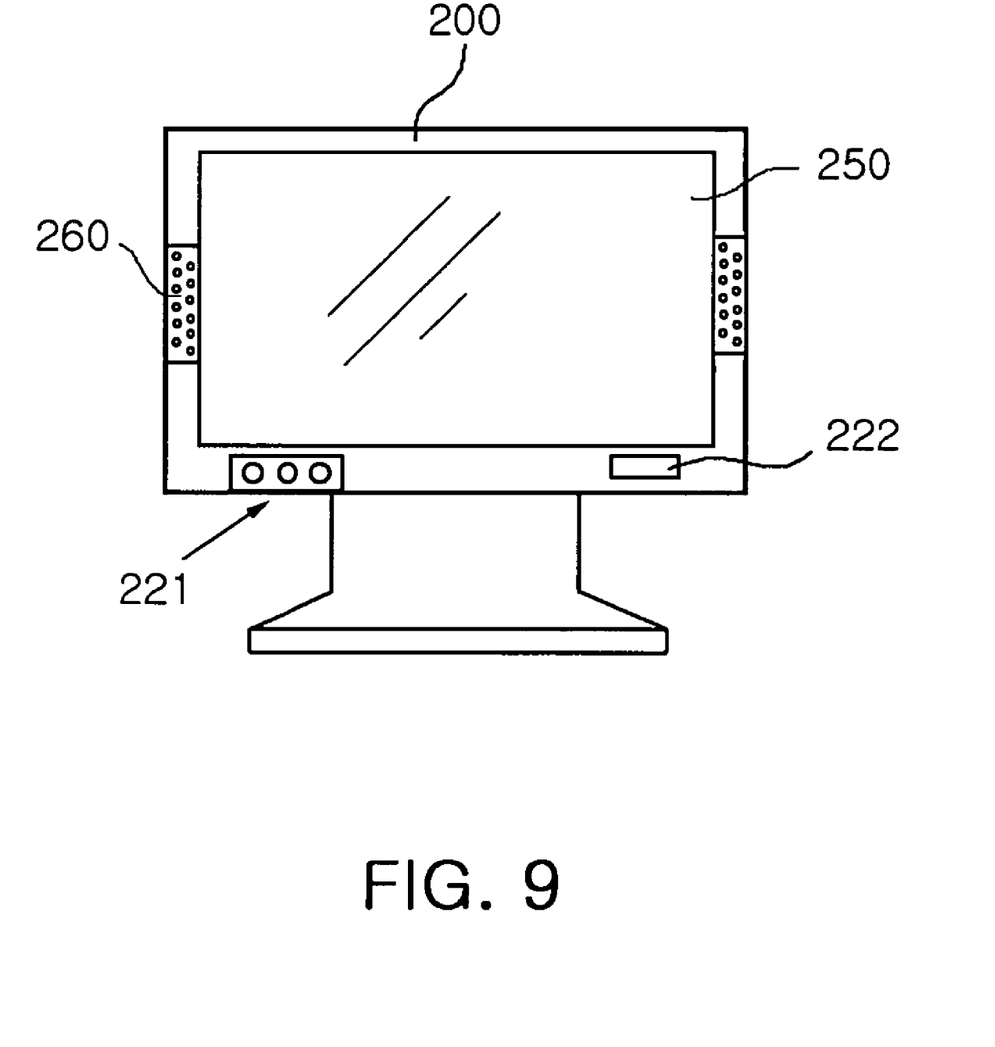
FIG. 9 is a front view of the display apparatus of FIG. 7.

FIG. 9 is a front view of the display apparatus 200 of FIG. 7. As shown in this drawing, the key input unit 220 is composed of two key panels 221 and 222 provided on the front surface of the display apparatus 200 of the present invention. The key panels 221 and 222 each include a plurality of keys. For example, the key panel 221 may include a power key, and the key panel 222 may include a TV reception mode selection/release key, a channel selection key and a volume adjustment key. The display unit 250 and speaker 260 are also provided on the front surface of the display apparatus 200.

Now, the operation of the present invention will be described in detail with reference to FIGS. 3 to 9.

Referring to FIGS. 3 and 4, in order to watch a desired TV broadcast through the TV receiving system according to the present invention, a user has to normally connect the TV broadcast receiving antenna ANT, the TV receiving module 100 and the display apparatus 200 as shown in FIG. 5a. Alternatively, the user may disconnect the TV receiving module 100 and the display apparatus 200 from each other as shown in FIG. 5b when he/she watches no TV broadcast. The connection between the TV receiving module 100 and the display apparatus 200 can be made via the detachable connector unit CNT. Namely, the TV receiving module 100 and the display apparatus 200 can be interconnected by coupling the first connector 100C of the TV receiving module 100 with the second connector 200C of the display apparatus 200.

The display apparatus 200 supplies desired power to the TV receiving module 100 to enable the TV receiving module 100. If the user selects a desired TV broadcast through the key input unit 220 of the display apparatus 200 shown in FIG. 7, the display apparatus 200 provides a control signal corresponding to the selected TV broadcast to the TV receiving module 100 via the detachable connector unit CNT. In response to the control signal from the display apparatus 200, the TV receiving module 100 selects a TV signal of the desired broadcast from among TV signals inputted from the TV broadcast receiving antenna ANT or cable and provides the selected TV signal to the display apparatus 200 via the detachable connector unit CNT. Then, the display apparatus 200 outputs a video signal and audio signal of the TV signal from the TV receiving module 100 through the display unit 250 and speaker 260 shown in FIGS. 7 and 9, respectively.

Referring to FIGS. 5a and 5b, the TV receiving module 100 and display apparatus 200 of the present invention can be detachably connected with each other via the detachable connector unit CNT (FIG. 5a) or be disconnected from each other (FIG. 5b). The display apparatus 200 of the present invention may preferably be a computer display apparatus, namely, a computer monitor. In this case, the display apparatus 200 functions as a TV receiver under the condition that it is connected with the TV receiving module 100 as shown in FIG. 5a, and as a computer monitor under the condition that it is disconnected from the TV receiving module 100 as shown in FIG. 5b.

Referring to FIG. 7, if the user interconnects the TV receiving module 100 and display apparatus 200 of the present invention via the detachable connector unit CNT and thereafter turns on the power key in the key input unit 220 of the display apparatus 200, then the power supply 210 of the display apparatus 200 supplies the desired power, or the external power, to the TV receiving module 100 via the detachable connector unit CNT at the same time as the internal power to the display apparatus 200.

The power supply 210 of the display apparatus 200 preferably supplies a plurality of different voltages necessary for the TV receiving module 100, for example, 5V, 12V, etc.

Referring to FIG. 8 which shows the circuit configuration of the power supply 210, an input AC voltage is rectified by the rectifier 211 of the power supply 210 and applied to the SMPS circuit 212, which then supplies the internal voltages to the display apparatus 200 and the external voltages to the TV receiving module 100, respectively. These voltages are detected and outputted by the voltage output circuit 213. At this time, the SMPS circuit 212 can supply a plurality of voltages, including a 12V voltage, as the internal voltages to the display apparatus 200 and voltages of 12V and 5V as the external voltages to the TV receiving module 100, respectively.

The power controller 214 of the power supply 210 provides a power control signal to control the output of the external voltages to the TV receiving module 100. The power switch 215 switches on/off the output of the external voltages from the voltage output circuit 213 to the TV receiving module 100 in response to the power control signal from the power controller 214. At this time, the external voltages from the voltage output circuit 213 are supplied to the TV receiving module 100 via the detachable connector unit CNT.

Thereafter, the user may select an analog TV broadcast or digital TV broadcast using the analog broadcast/digital broadcast selection key in the key input unit 220 and thereafter a desired channel using the channel selection key therein. Also, the user may select a desired volume level using the volume adjustment key in the key input unit 220. As a result, the controller 230 of the display apparatus 200 provides a control signal corresponding to a key signal inputted through the key input unit 220 to the TV receiving module 100 via the detachable connector unit CNT.

Referring to FIG. 6, the TV receiving module 100 of the present invention can be manufactured in a small-size form because it has no self-display panel and self-power supply. As stated above, the TV receiving module 100 enters an operable state upon receiving the desired power supplied from the display apparatus 200.

At this time, in the TV receiving module 100, the microprocessor 130 is operated according to the control firmware stored in the memory 120 to receive the control signal from the display apparatus 200 through the first connector 100C and provide a TV broadcast selection signal to the tuner unit 110 in response to the received control signal.

The tuner unit selects a TV signal of a desired broadcast from among TV signals inputted from the TV broadcast receiving antenna ANT or cable in response to the TV broadcast selection signal from the microprocessor 130 and provides the selected TV signal to the microprocessor 130 and also to the display apparatus 200 via the connector unit CNT.

For example, in the case where the microprocessor 130 generates a TV broadcast selection signal containing an analog broadcast selection signal and channel selection signal in response to the control signal from the display apparatus 200, the tuner of the tuner unit 110 selects a TV broadcast channel in response to the channel selection signal of the TV broadcast selection signal from the microprocessor 130. In response to the analog broadcast selection signal of the TV broadcast selection signal, the analog demodulator of the tuner unit 110 demodulates an analog TV broadcast signal selected by the tuner and provides the resulting audio and video signals to the display apparatus 200 through the detachable connector unit CNT.

As another example, in the case where the microprocessor 130 generates a TV broadcast selection signal containing a digital broadcast selection signal and channel selection signal in response to the control signal from the display apparatus 200, the tuner of the tuner unit 110 selects a TV broadcast channel in response to the channel selection signal of the TV broadcast selection signal from the microprocessor 130. In response to the digital broadcast selection signal of the TV broadcast selection signal, the digital demodulator of the tuner unit 110 demodulates a digital TV broadcast signal selected by the tuner and provides the resulting MPEG signal to the microprocessor 130. Then, the microprocessor 130 performs a desired signal processing with respect to an input TV signal from the tuner unit 110 and provides the resulting TV signal to the display apparatus 200 via the detachable connector unit CNT. Meanwhile, the audio processor 140 of the TV receiving module 100 processes an audio signal of the TV signal from the microprocessor 130 and provides the resulting audio signal to the display apparatus 200 via the detachable connector unit CNT.

In the display apparatus 200, the controller 230 receives the TV signal from the TV receiving module 100 through the detachable connector unit CNT and provides it to the signal processor 240. The signal processor 240 processes a video signal of the TV signal from the second connector 200C to be displayable on the screen and adjusts the level of an audio signal of the TV signal. Thereafter, the display unit 250 outputs a video signal from the signal processor 240 to the screen, and the speaker 260 outputs an audio signal from the signal processor 240.

On the other hand, a computer monitor, such as an LCD monitor, may be applied as the display apparatus of the present invention. In this case, as stated previously, the key input unit 220 has to further include a TV/monitor mode selection key, and the controller 230 must be configured to control a TV receiving operation or monitor operation.

That is, in the case where a computer monitor is applied as the display apparatus of the present invention, it must be selectively operated in a TV reception mode or monitor mode as stated previously, in a different manner from the case where a tunerless TV receiver is applied as the display apparatus.

Figure 10:
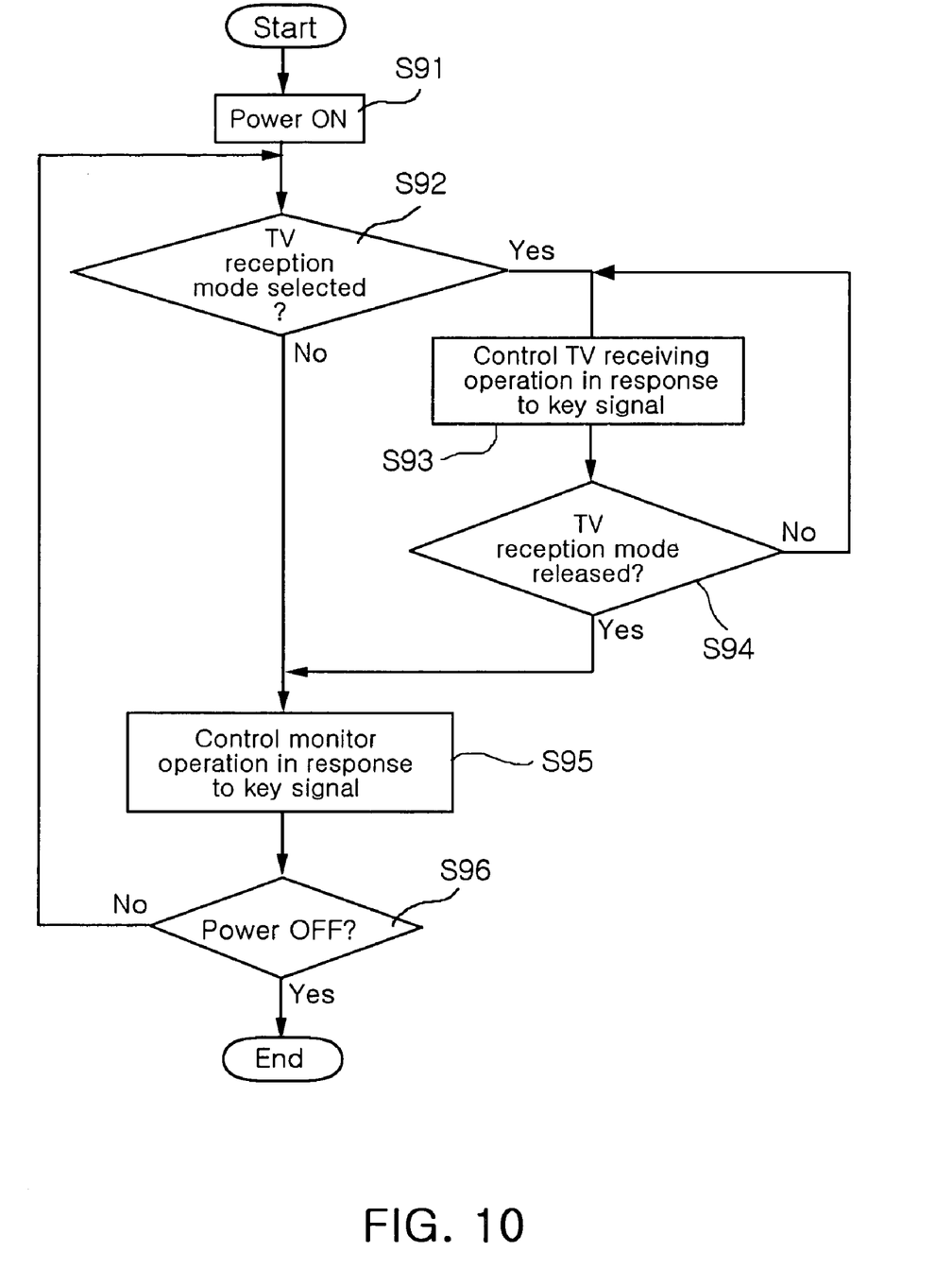
FIG. 10 is a flow chart illustrating the operation of the display apparatus according to the present invention.

FIG. 10 is a flow chart illustrating the operation of the display apparatus according to the present invention in the case where a computer monitor is applied as the display apparatus. First, if the power key in the key input unit 220 is turned on (S91), then the power supply 210 supplies the internal power to the display apparatus and the desired power to the TV receiving module, respectively. As a result, the controller 230 is operated to determine whether the TV reception mode is selected (S92). If the TV reception mode is determined to be selected, then the controller 230 controls the TV receiving operation in response to a key signal inputted through the key input unit 220 (S93).

In this TV reception mode, the controller 230 periodically determines whether the TV reception mode is released (S94). Upon determining that the TV reception mode is not released, the controller 230 performs the TV reception mode continuously. However, if the TV reception mode is released, then the controller 230 enters the monitor mode to control the monitor operation in response to a key signal inputted through the key input unit 220 (S95). This procedure is carried out repeatedly until the power key is turned off (S96).

As described above, in the TV receiving system of the present invention, the TV receiving module and the display apparatus can be detachably connected with each other or be disconnected from each other. Preferably, the TV receiving module is able to receive an analog TV broadcast and/or digital TV broadcast, and does not need a separate display panel or voltage conversion circuit. Preferably, a computer monitor such as an LCD monitor, or a TV receiver such as a PDP TV receiver, more preferably a tunerless TV receiver, can be applied as the display apparatus of the present invention.

As apparent from the above description, the present invention provides a TV receiving module and a display apparatus and a TV receiving system using the same, wherein the TV receiving module is small in size and is detachably mounted outside or inside of the display apparatus. The display apparatus is preferably an LCD monitor or a PDP TV receiver and is adapted to supply desired power to the TV receiving module and control a TV receiving operation and a display operation at one time through a simple operation such as a one-touch operation.

According to the present invention, the TV receiving module has no self-display panel and self-power supply, thereby making it possible to manufacture the TV receiving module in a small-size form, simply and conveniently mount it on the display apparatus and utilize a computer monitor as a TV receiver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A TV receiving system comprising:
   a TV receiving module for selecting and receiving a TV signal of a desired broadcast from among TV signals inputted from a TV broadcast receiving antenna or cable and providing the received TV signal, including:
   detachable connector means including a first connector installed in said TV receiving module for receiving external power and an external control signal and providing the TV signal received by said TV receiving module externally, and a second connector detachably coupled with said first connector;
   a memory for storing a control firmware and data necessary for control and operation;
   a microprocessor for receiving said external power through said detachable connector means, said microprocessor being operated according to said control firmware stored in said memory to receive said external control signal through said detachable connector means, provide a TV broadcast selection signal in response to the received control signal, perform a desired signal processing with respect to an input TV signal and provide the resulting TV signal to said display apparatus via said detachable connector means;
   tuner means for receiving said external power through said detachable connector means, selecting a TV signal of a desired broadcast from among the TV signals inputted from said TV broadcast receiving antenna or cable in response to said TV broadcast selection signal from said microprocessor and providing the selected TV signal as said input TV signal to said microprocessor; and
   an audio processor for processing an audio signal of said TV signal from said microprocessor;
   a display apparatus connected to said TV receiving module via said second connector of said detachable connector means for providing said external power and external control signal to said TV receiving module, receiving said TV signal from said TV receiving module and outputting video and audio signals of the received TV signal, including:
   a power supply for supplying internal power to said display apparatus and said external power having a plurality of different voltages to said TV receiving module, respectively;
   a key input unit including a plurality of keys necessary for a TV receiving operation, said keys including a TV channel selection key and a volume adjustment key;
   a controller for generating a control signal corresponding to a key signal inputted through said key input unit, providing the generated control signal to said TV receiving module through said second connector to control said TV receiving operation in response to the key signal, and receiving said TV signal from said TV receiving module through said second connector;
   a signal processor for processing a video signal of said TV signal from said detachable connector means to be displayable on a screen and adjusting a level of an audio signal of said TV signal;
   a display unit for outputting a video signal from said signal processor to said screen; and
   a speaker for outputting an audio signal from said signal processor;
   wherein said TV broadcast selection signal from said microprocessor includes:
   an analog broadcast/digital broadcast selection signal for selection of an analog TV broadcast or a digital TV broadcast; and
   a TV channel selection signal for selection of a channel in the selected analog TV broadcast or digital TV broadcast;
   wherein said tuner means includes:
   a tuner for selecting a TV broadcast channel in response to said channel selection signal of said TV broadcast selection signal from said microprocessor;
   an analog demodulator responsive to said analog broadcast/digital broadcast selection signal of said TV broadcast selection signal for demodulating an analog TV broadcast signal selected by said tuner and providing the resulting audio and video signals through said first connector; and
   a digital demodulator responsive to said analog broadcast/digital broadcast selection signal of said TV broadcast selection signal for demodulating a digital TV broadcast signal selected by said tuner and providing the resulting MPEG signal to said microprocessor;
   wherein said first connector includes:
   a power terminal for receiving said external power from said display apparatus;
   a transmission terminal for outputting TV reception information from said microprocessor;
   a reception terminal for receiving said external control signal from said display apparatus;

an A/V terminal for outputting an analog A/V signal from said tuner means;
a video signal terminal for outputting a video signal from said microprocessor; and
an audio signal terminal for outputting an audio signal from said audio processor;
wherein said power terminal, transmission terminal, reception terminal, A/V terminal, video signal terminal and audio signal terminal of said first connector are implemented with pins, respectively;
wherein said second connector includes;
a power terminal for supplying said external power from said power supply to said TV receiving module;
a reception terminal for receiving TV reception information from said TV receiving module;
a transmission terminal for transmitting said control signal from said controller to said TV receiving module;
an A/V terminal for receiving an analog A/V signal from said TV receiving module;
a video signal terminal for receiving a video signal from said TV receiving module; and
an audio signal terminal for receiving an audio signal from said TV receiving module; and
wherein said power terminal, transmission terminal, reception terminal, A/V terminal, video signal terminal and audio signal terminal of said second connector are implemented with pins, respectively.

2. The TV receiving system as set forth in claim 1, wherein said display apparatus is a TV receiver for receiving analog TV broadcasts.

3. The TV receiving system as set forth in claim 1, wherein said display apparatus is a POP TV receiver.

4. The TV receiving system as set forth in claim 1, wherein said display apparatus is a computer monitor.

5. The TV receiving system as set forth in claim 4, wherein said computer monitor is an LCD monitor.

* * * * *